United States Patent
Srinivasan et al.

(10) Patent No.: US 6,889,338 B2
(45) Date of Patent: May 3, 2005

(54) ELECTING A MASTER SERVER USING ELECTION PERIODIC TIMER IN FAULT-TOLERANT DISTRIBUTED DYNAMIC NETWORK SYSTEMS

(75) Inventors: Anand Srinivasan, Kanata (CA); Pramod Dhakal, Nepean (CA)

(73) Assignee: Nortel Networks Limited (CA)

( * ) Notice: Subject to any disclaimer, the term of this patent is extended or adjusted under 35 U.S.C. 154(b) by 653 days.

(21) Appl. No.: 09/961,379

(22) Filed: Sep. 25, 2001

(65) Prior Publication Data
US 2003/0037283 A1 Feb. 20, 2003

Related U.S. Application Data

(60) Provisional application No. 60/312,094, filed on Aug. 15, 2001.

(51) Int. Cl.[7] ................................................. G06F 11/00
(52) U.S. Cl. ............................................. 714/4; 714/13
(58) Field of Search ................................ 714/4, 13, 11, 714/12, 43, 55; 709/208, 209

(56) References Cited

U.S. PATENT DOCUMENTS

| | | | |
|---|---|---|---|
| 5,926,619 A | * 7/1999 | Badovinatz et al. | ............ 714/4 |
| 6,363,416 B1 | * 3/2002 | Naeimi et al. | .............. 709/209 |
| 6,748,447 B1 | * 6/2004 | Basani et al. | ............... 709/244 |
| 2002/0165977 A1 | * 11/2002 | Novaes | ....................... 709/238 |
| 2002/0169861 A1 | * 11/2002 | Chang et al. | ............... 709/223 |

* cited by examiner

*Primary Examiner*—Scott Baderman
(74) *Attorney, Agent, or Firm*—Steubing McGuinness & Manaras LLP

(57) ABSTRACT

A fault-tolerant server group operating in client-server distributed dynamic network system environment includes a master server which receives a request sent by a client. The fault-tolerant server group includes the master server and at least one back-up server. The master server communicates with both the client and the back-up servers. Each server in the fault-tolerant server group, including the master server and the back-up servers, has an election mechanism, enabling the fault-tolerant server group to elect a new master server when the master server fails. During the election, some of the election mechanisms are triggered at different times. The fault-tolerant server group processes the request from the client to generate processing result. The processing result is sent from the master server to the client.

47 Claims, 9 Drawing Sheets

- Equally periodic

- Integrally periodic

ELECTING A MASTER SERVER USING ELECTION PERIODIC TIMER IN FAULT-TOLERANT DISTRIBUTED DYNAMIC NETWORK SYSTEMS

APPLICATION DATA

This application relates to and claims priority from U.S. patent Application No. 60/312,094, titled "Electing a Master Server Using Election Periodic Timer in Fault-Tolerant Distributed Dynamic Network Systems," filed Aug. 15, 2001, the contents of which are incorporated herein by reference.

This patent application and another are being filed simultaneously that relate to various aspects of fault tolerant distributed dynamic network systems. The other patent application is entitled "Self-Monitoring Mechanism in Fault-Tolerant Distributed Dynamic Network Systems" and has the same inventors and is commonly owned herewith and has U.S. Ser. No. 09/963,687. The subject matter of the application entitled "Self-Monitoring Mechanism in Fault-Tolerant Distributed Dynamic Network Systems" is hereby incorporated herein by reference.

BACKGROUND

1. Field of the Invention

Aspects of the present invention relate to the field of network systems. Other aspects of the present invention relate to fault-tolerant network systems.

2. General Background and Related Art

Client and server architecture is nowadays adopted in most computer application systems. With this architecture, a client sends a request to a server and the server processes the client's request and sends results back to the client. Typically, multiple clients may be connected to a single server. For example, an electronic commerce system or an eBusiness system may generally comprise a server connected to a plurality of clients. In such an eBusiness system, a client may conduct business electronically by requesting the server to perform various business-related computations such as recording a particular transactionor generating a billing statement.

More and more client and server architecture based application systems cross networks. For example, a server that provides eBusiness related services may be located in California in the U.S.A. and may be linked to clients across the globe via the Internet. Such systems may be vulnerable to network failures. A problem occurring at any location along the pathways between a server and its clients may compromise the quality of the services provided by the server.

A typical solution to achieve a fault tolerant server system is to distribute replicas of a server across, for example, geographical regions. To facilitate the communication between clients and a fault tolerant server system, one of the distributed servers may be elected as a master server. Other distributed servers in this case are used as back-up servers. The master server and the back-up servers together form a virtual server or a server group.

FIG. 1 shows a configuration of a client and a server group across network. In FIG. 1, a server group comprises a master server 110 and a plurality of back-up servers 120a, . . . , 120b, 120c, . . . 120d. The master server 110 communicates with its back-up servers 120a, 120b, 120c, and 120d via network 140. The network 140, which is representative of a wide range of communication networks in general such as the Internet, is depicted here as a "cloud". A client 150 in FIG. 1 communicates with the server group via the master server 110 through the network 140, sending requests to and receiving replies from the master server 110.

A global name server 130 shown in FIG. 1 may also be part of the configuration. The global name server 130 is where the master server 110 registers its mastership and where the reference to a server group, such as the one shown in FIG. 1, can be acquired or retrieved. The global name server 130 may also be distributed according to, for example, geographical locations (not shown in FIG. 1). In this case, the distributed name servers may coordinate among themselves to maintain the integrity and the consistency of the registration information.

In FIG. 1, even though the client 150 interfaces only with the master server 110, all the back-up servers maintain the same state as the mater server 110. That is, client requests are forwarded to all back-up servers 120a, 120b, 120c, and 120d and the back-up servers concurrently process the client requests. The states of the back-up servers are continuously synchronized with the state of the master server 110.

In a fault tolerant server system, when the master server fails, back-up servers may elect a new master. The newly elected master then resumes the communications to the clients and the other back-up servers. FIG. 2 shows such a fault tolerant system. In FIG. 2, when the master server 110a fails, the back-up servers elect a new master server 110b. Once elected, the new master server 110b registers its mastership with the name server and resumes the functionality of the original master server 110a.

There are various challenges associated with electing a new master in a fault-tolerant server system. Depending on the distribution scope of the servers from the same server group, the degree of the difficulty varies. For example, a fault-tolerant server system distributed across the globe may have to deal with more challenging issues, compared with a fault-tolerant server system across a LAN. Furthermore, when a server group is distributed across the globe, the communication delays between the master server and different back-up servers may differ significantly. In this case, it may be more difficult to synchronize between the master and the back-up servers.

When electing a new master server, the involved servers may send messages to each other. When there are a large number of back-up servers distributed across the network, hundreds or even thousands of election messages are often sent, causing waste of resources. In addition, depending on which back-up server is elected as the new master server, the number of messages to be sent among back-up servers may vary.

SUMMARY OF THE INVENTION

This invention provides a way for a fault-tolerant server group in distributed dynamic network systems to automatically elect a master server, when an original master server is not functional, using at least one election periodic timer, each associated with one server in the server group. The election periodic timer causes the election to occur at different times for at least some of the servers.

BRIEF DESCRIPTION OF THE DRAWINGS

The present invention is further described in the detailed description which follows, by reference to the noted drawings by way of non-limiting embodiments, in which like reference numerals represent similar parts throughout the several views of the drawings, and wherein.

DETAILED DESCRIPTION OF SEVERAL EMBODIMENTS

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

The processing described below may be performed by a general-purpose computer alone or in connection with a specialized computer. Such processing may be performed by a single platform or by a distributed processing platform. In addition, such processing and functionality can be implemented in the form of special purpose hardware or in the form of software being run by a general-purpose computer. In this application, the term "mechanism" is termed to refer to any such implementation. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

Figure 1:
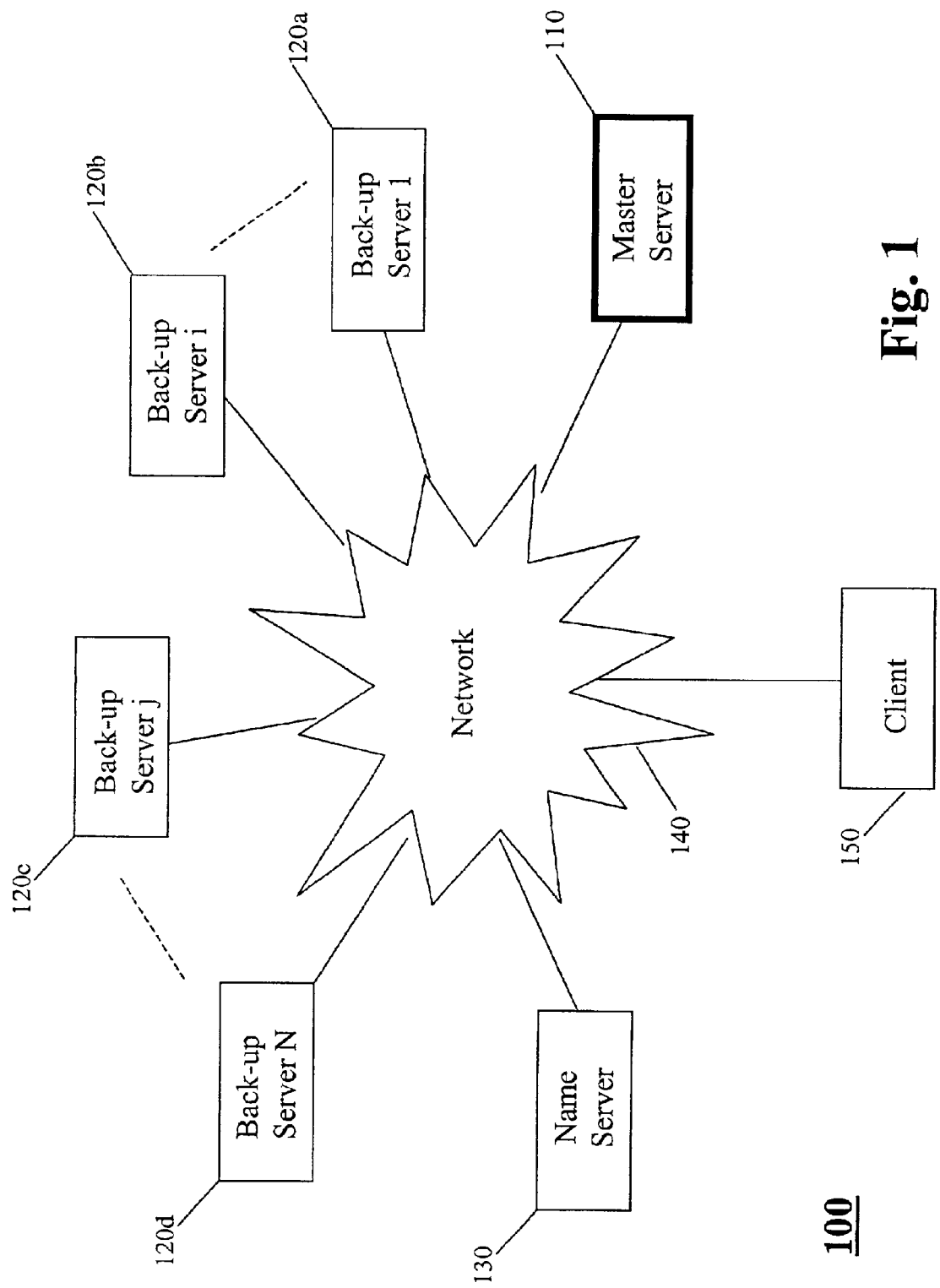
FIG. 1 shows a typical configuration of a client and a server group in a fault-tolerant distributed network.
Figure 2:
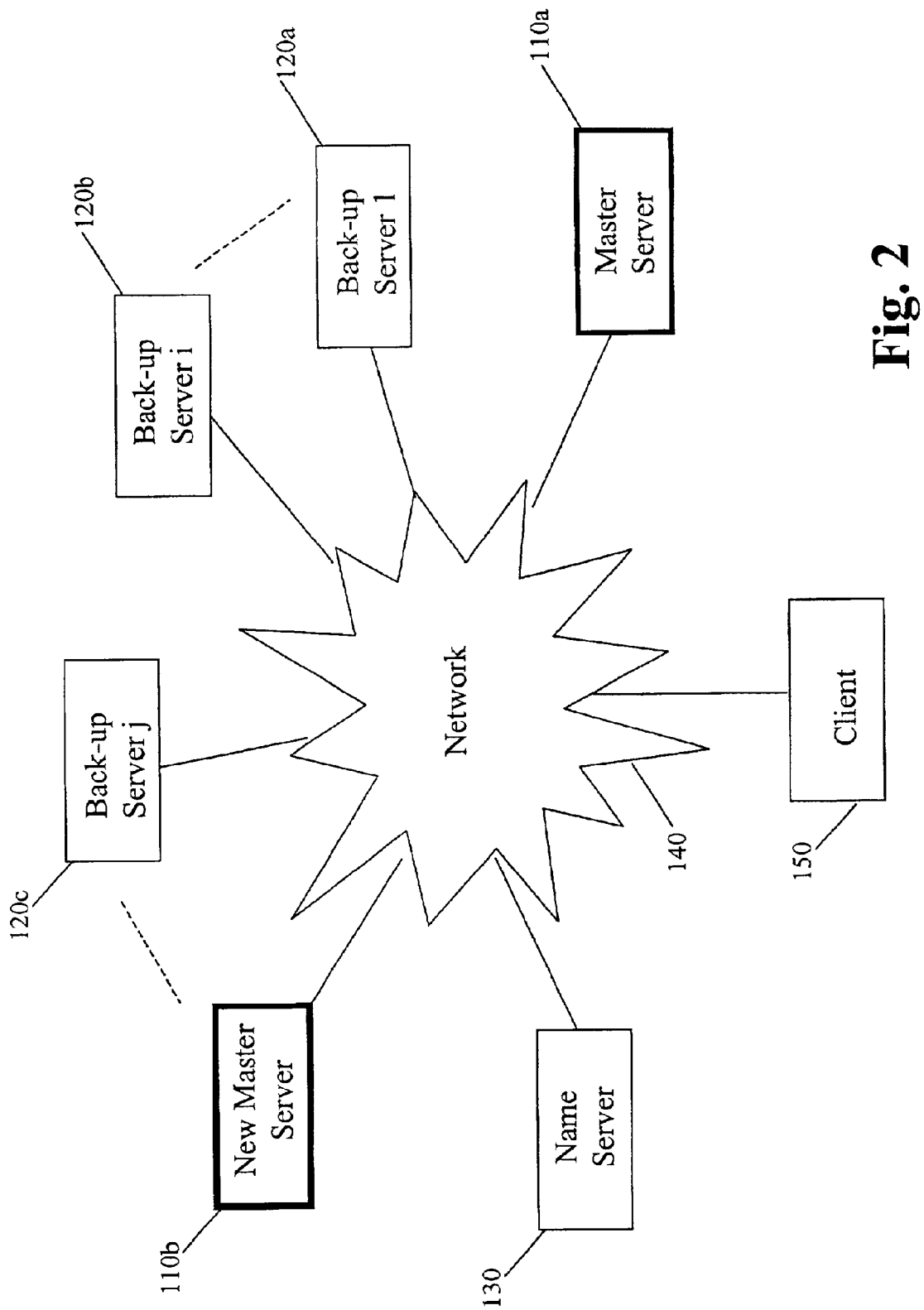
FIG. 2 illustrates the scenario in which a back-up server is elected as a new master server when the original master server fails.
Figure 3:
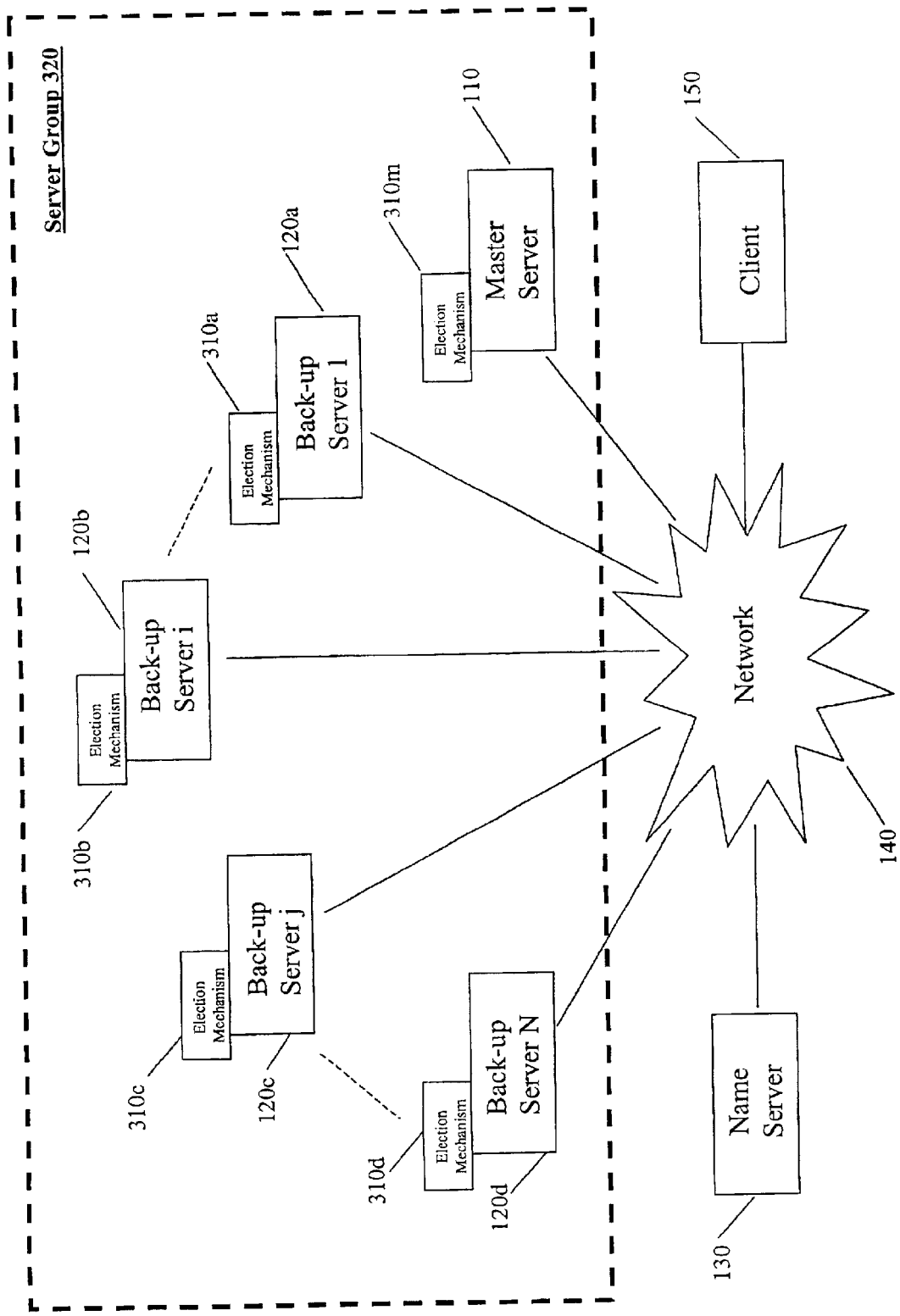
FIG. 3 shows one embodiment of the invention, in which an election mechanism is installed on every server in a server group.

FIG. 3 shows an embodiment 300 of the invention, in which an election mechanism is installed and may be activated on all the servers, including a master server and a plurality of back-up servers, that form a server group. System 300 comprises a server group 320 which includes a master server 110, a plurality of back-up servers 1-N 120a, . . . , 120b, 120c, . . . , 120d, and a plurality of election mechanisms 310a, . . . , 310b, 310c, . . . , 310d (attached to the master server 110 as well as to the back-up servers 1-N 120a, . . . , 120b, 120c, . . . , 120d), a name server 130, a client 150, and a network 140.

The master server 110 and the back-up servers 1-N 120a, . . . , 120b, 120c, . . . , 120d form the fault tolerant server group 320 that provides the client 150 services. Example of such services may include Internet Service Provider services or on-line shopping services. The servers in the server group 320 may be distributed across the globe. For example, the master server 110 may be physically located in Ottawan, Canada, the back-up server 1 120a may be physically located in Atlanta, USA, the back-up server i 120b may be physically located in Bangalore, the back-up server j 120c may be physically located in Sydney, and the back-up server N 120d may be physically located in Tokyo. The servers in the server group 320 communicate with each other via the network 140 which is representative of a wide range of communications networks in general.

The client 150 communicates with the server group 320 by interfacing with the master server 110 through the network 140. The master server 110 interacts with the back-up servers via the network 140. When the client 150 sends a request to the master server 110, the master server 110 forwards the client's request to the back-up servers 1-N (120a, . . . , 120b, 120c, . . . , 120d). All the servers in the server group 320 concurrently process the client's request and the master server 110 sends the results back to the client 150. The states of the servers in the server group 320, including the master server 110 and the back-up servers 1-N 120a, . . . , 120b, 120c, . . . , 120d, are continuously synchronized.

The mastership of the master server 110 may be registered in the name server 130. Each server group may register a desired number of servers as the master servers and the registration may explicitly use both the identification of the server group as well as the identification of the master server being registered. Through the name server 130, a client may access or retrieve information such as registered master servers.

The name server 130 may also be distributed (not shown in FIG. 3). In this case, the integrity and the consistency of the registrations for the master servers may be maintained across the distributed name servers. For instance, if distributed name servers have multiple copies of the registrations, these copies should contain the same content. Also when the mastership for a server group changes, the copies of the original registration, which may be scattered in distributed name servers, may have to be updated simultaneously to maintain the consistency of the registration information.

As shown in FIG. 3, the election mechanisms 310a, . . . , 310b, 310c, . . . , 310d are attached to all the servers in the server group 320. With an election mechanism running, a back-up server may regularly check to see whether the master server 110 is functional. When the master server 110 is detected to be not functioning, the election mechanism running on each back-up server enables the underlying back-up server to participate in an election, in which a new master server is elected to replace the master server 110. The detection performed by each back-up server to see whether the master server 110 is functional may be carried out regularly with a well defined time interval. Different back-up servers may perform the regular checks either synchronously or asynchronously.

Figure 4:
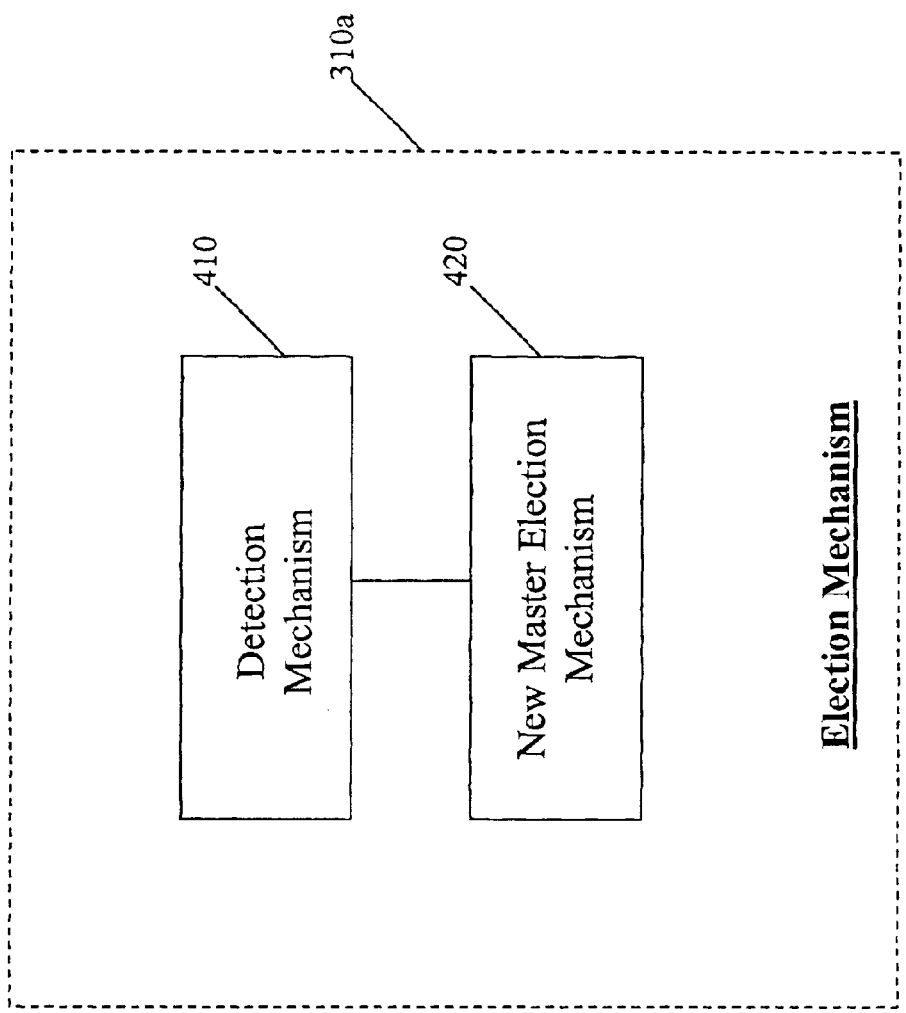
FIG. 4 is a high level functional block diagram of an election mechanism.

FIG. 4 shows a high level functional diagram of an election mechanism (310a). In FIG. 4, the election mechanism 310a comprises a detection mechanism 410 and a new master election mechanism 420. The detection mechanism 410 detects when the master server 110 fails. The detection unit 410 may be activated regularly by a timer after a specified length of time. The length of the time specified in the timer determines the periodicity of the detection mechanism 410. The election mechanisms installed on different back-up servers may employ either equal or different periodicity for the detection. The activation may be synchronous or asynchronous.

Figure 7A:
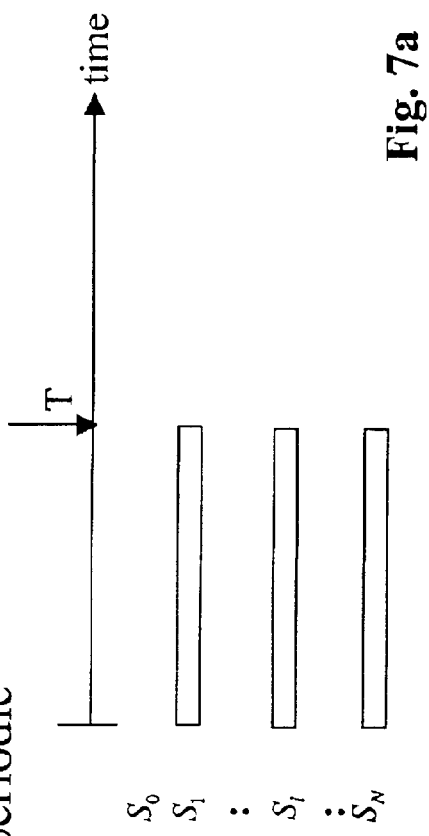
FIGS. 7a and 7b illustrate two sample periodicity schemes.
Figure 7B:
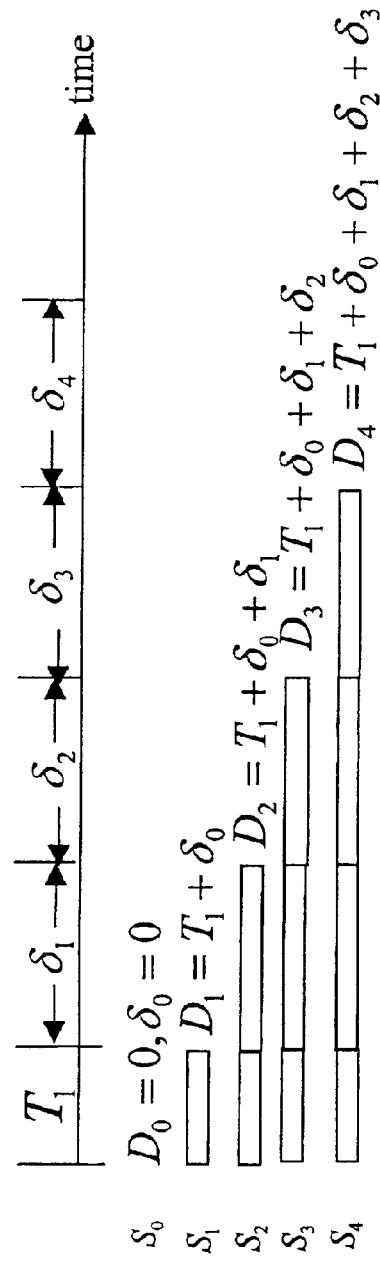

FIGS. 7a and 7b show timers with different types of periodicity. As illustrated in FIG. 7a, timers with an equal periodicity are controlled by cycles of the same length of time. As illustrated in FIG. 7b, timers with non-equal periodicity are controlled by cycles of different lengths of time.

When the detection mechanism 410 on a particular back-up server is activated or triggered, it sends an inquiring message to the master server 110 to check whether the master server 110 is still functional. This may be achieved by detecting whether the master server 110 responds to the inquiring message in a specified time limit. Upon detecting the failure of the master server 110, the new master election mechanism 420 enables the underlying back-up server to start an election in which a new master for the server group 320 is selected to replace the failed master server 110.

Figure 5:
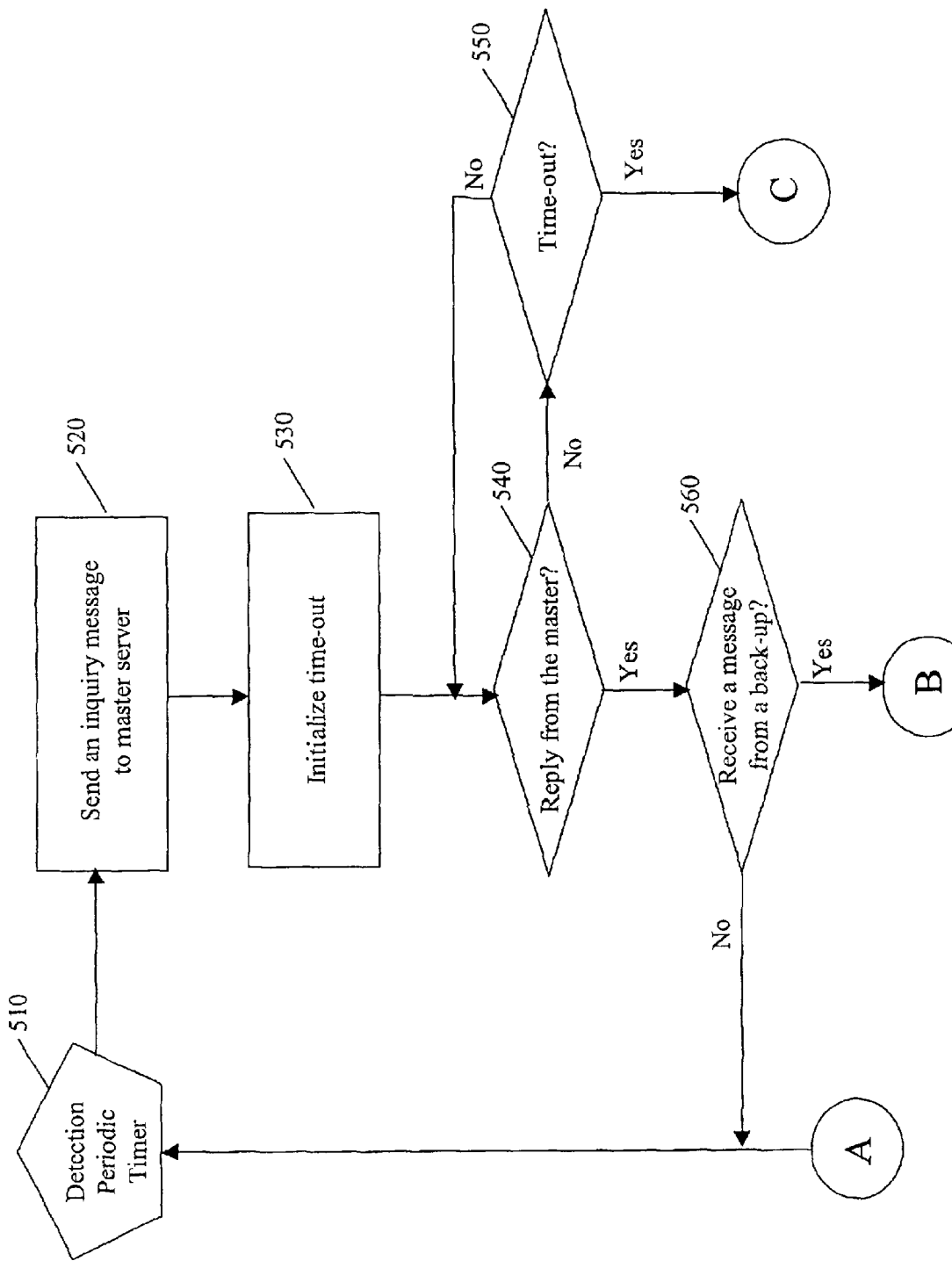
FIG. 5 is a sample flowchart of a detection unit, which detects when a master server fails.

FIG. 5 is a sample flowchart of the detection mechanism 410. In FIG. 5, the detection of the failure of an existing master server is activated by a detection periodic timer 510. The detection periodic timer 510 regulates how often each server checks whether its corresponding master server is functional. The detection periodic timer 510 may specify a particular time interval by which the detection mechanism 410 is regularly activated.

Once the detection mechanism 410 is activated, it sends an inquiry message, at act 520, from the underlying back-up server (on which the detection mechanism 410 is running) to the master server 110. A time-out condition may then be immediately initialized, at act 530, to start a different timer (not shown) that counts towards a time-out criterion. The time-out criterion may specify the length in time by which the underlying back-up server expects the master server 110 to respond.

If a reply to the inquiry message is received from the master server 110, determined at act 540, it indicates that the master server 110 is functional. If no reply to the inquiry is received from the master server 110, the time-out condition is evaluated at act 550. If the time-out criterion is not yet satisfied at act 550, the detection unit 410 returns to act 540 to wait for a reply from the master server 110. If the time-out criterion is satisfied at act 550, it indicates that the underlying back-up server did not receive a reply from the master server 110 within specified time-out limit. In this case, the master server 110 is considered no longer functional. In this case, the underlying back-up server enters an election process (performed by the new master election mechanism 420) via C.

If the master server 110 is functional, determined at act 540, the detection mechanism 410 may further examine, at act 560, to see whether a message from a different back-up server is received over the network. If no message is received, the detection mechanism 410 goes back to detection periodic timer 510 to wait until the detection periodic timer 510 activates it again.

If a message from a different back-up server is received at act 560, it may indicate that multiple servers have been set as masters. The detection mechanism 410 proceeds to an election process (performed by the election mechanism 420) via B. This scenario (to enter election after a back-up server detects that the master server 110 is functional) is possible because although some of the back-up servers consider the master server 110 to be functional, there may be other back-up servers that may detect that the master server is no longer functional. For example, if some back-up servers have lost connection with the master server 110 (e.g., due to, for example, a network partition), those back-up servers may decide to elect a new master. In this case, the message received at act 560 by the underlying back-up server may include a message from a particular back-up server that claims a new mastership. In this situation, the message received at act 560 may request the underlying back-up server to accept the new mastership and to update its states accordingly.

Figure 6:
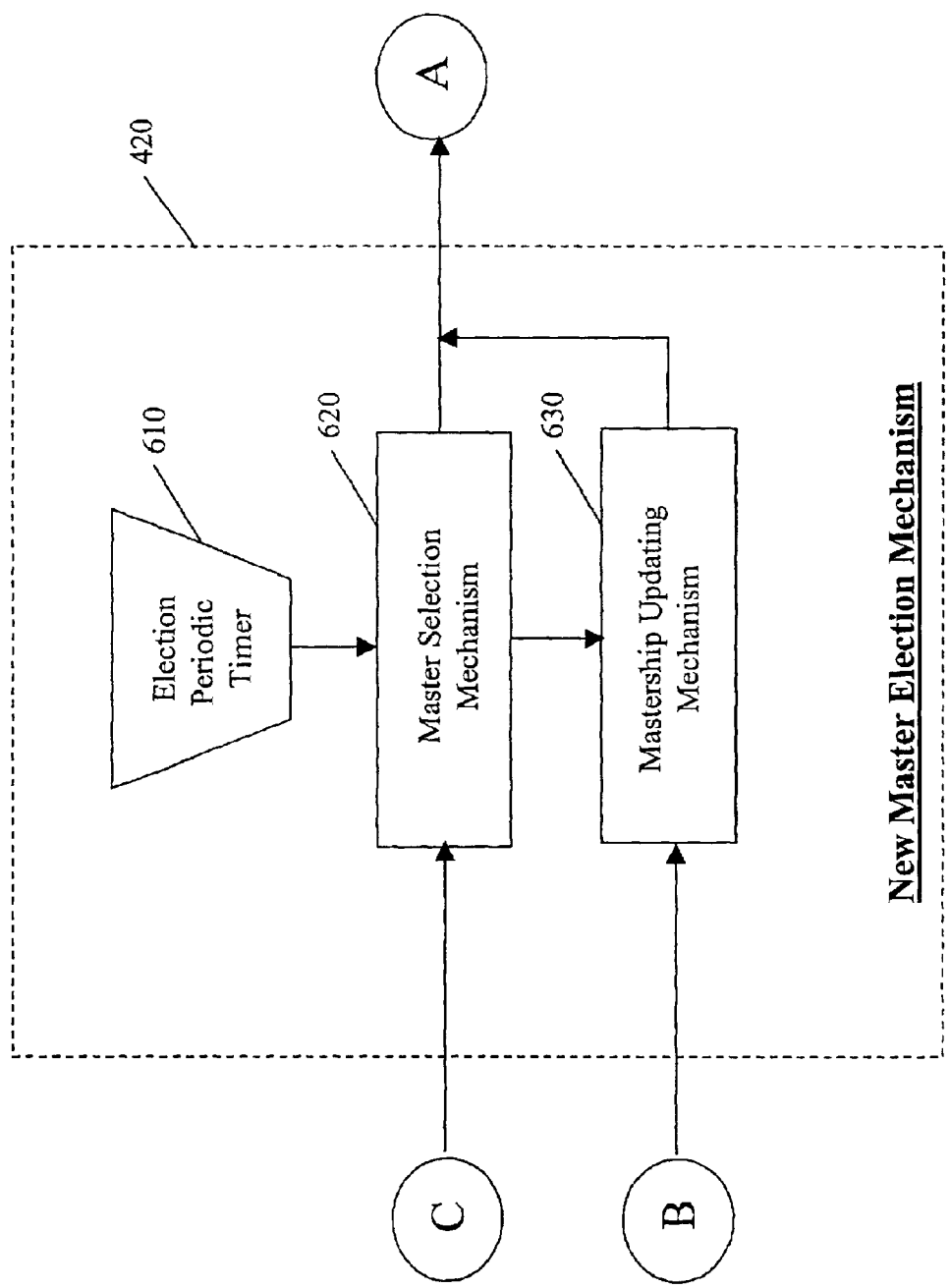
FIG. 6 is a high level functional block diagram of an election unit.

Referring back to FIG. 4, in the election mechanism 310a, when the master server 110 fails, detected by the detection mechanism 410, the election mechanism 310a enters an election process and the election mechanism 420 is activated. FIG. 6 shows a high level functional block diagram of the new master election mechanism 420. In FIG. 6, the new master election mechanism 420 comprises an election periodic timer 610, a master selection mechanism 620, and a mastership updating mechanism 630. The election periodic timer 610 is used to control the timing of claiming mastership. The master selection mechanism 620 is invoked when a back-up server claims itself as the newly elected master server. In this case, the newly elected master server may send a claiming message to all other servers in the same server group to establish its mastership.

The mastership updating mechanism 630 is invoked when a back-up server receives a message that attempts to establish a new mastership. In this case, the back-up server (that receives the message) determines whether to accept or to contest the newly elected master server. In the latter case, the back-up server may send a different message to all the servers in the same server group to revoke the newly claimed mastership. At the same time, the back-up server claims itself as the new master server.

FIG. 6, the election periodic timer 610 may be set up in a manner that it plays a similar role as a time-out mechanism. For example, when the master server 110 is detected no longer functional, a back-up server enters an election process by first initiating the election periodic timer 610. The back-up server may then wait (or enter a sleep mode) until the time, specified by the election periodic timer 610, has elapsed and then declares itself as the new master. This wait time represents an election delay time. The length of the election delay time set up in each election periodic timer may be adjusted accordingly for the corresponding back-up server.

FIGS. 7a and 7b illustrate two methods to set up the length of election delay time in the election periodic timer 610. In FIGS. 7a and 7b, assume servers in a server group are denoted by $S_0, S_1, \ldots, S_N$, where $S_0$ is assumed to be a master server and N+1 is the total number of servers in the server group. FIG. 7a corresponds to an equally periodic timer in which the same election delay time, for example T, is set up for every server. That is, each server may wait the same amount of time before it declares its mastership. Since the master server does not participate the election, the wait time does not apply. In implementation, the wait time for a master server may simply be set as zero.

With an equal periodicity, the situation may arise in which multiple servers may claim the mastership at substantially the same time. To reach a state with only one elected master server, it may take multiple rounds of messages to settle among back-up servers. While it may be an adequate solution when the number of servers in a server group is reasonably small, with a larger number of servers, hundreds or thousands of messages may be sent across the network that may cause inefficiency.

In an embodiment shown in FIG. 7b, a different election delay time may be set up for each server. One mechanism for setting different election delay times for different servers is illustrated in FIG. 7b. The election delay time for a particular server, for example $S_i$, may be determined according to its relative rank, determined by its index value i, in the server group. The rank of a server is the inverse of its index value. Therefore, server $S_i$ ranks higher than server $S_j$ if i<j.

Assume $D_i$ is the election delay time of the $i^{th}$ server $S_i$. In the example shown in FIG. 7b, there are five servers ranked in the order of ($S_0$, $S_1$, $S_2$, $S_3$, $S_4$), where server $S_0$ is a master server. Since a master server does not participate election, its election delay time does not apply. This may be realized by, for example, setting the election delay time for $S_0$ (i.e., the master server) to be zero. That is, $D_0=0$. Each of the four back-up servers (i.e., $S_1$, $S_2$, $S_3$, $S_4$) corresponds to a timer with different election delay times ($D_1$, $D_2$, $D_3$, $D_4$), the election delay time $D_i$ for back-up server $S_i$ may be defined as a summation of a base election delay time $T_1$ and an adjusted election delay time $$\sum_{j=0}^{i-1} \delta_j,$$

where each $\delta_j$, $0 \leq j \leq i \leq 1$, corresponds to an adjusted waiting time for server $S_j$. That is, $$D_i = T_1 + \sum_{j=0}^{i-1} \delta_j,$$

$1 \leq i \leq N$. Similarly, the adjusted waiting time for the master server may be set to zero $\delta_0=0$.

With the above definition for election delay time, the base election delay time $T_1$ may be viewed as the minimum delay before a back-up server can start an election. Each term $\delta_j, 0 \leq j \leq i-1$, in FIG. 7b, may be defined as the maximum communication delay between server $S_j$ and servers $S_k$, $j+1 \leq k \leq N$; defined as $\delta_j = \max\{C_{j,k}, j+1 \leq k \leq N\}$, where $C_{j,k}$ is the communication delay between servers $S_j$ and $S_k$.

The above defined sample periodic timer may be termed as an integral periodic timer, by which each server derives an election delay time that is based on an accumulative delay time and that is correlated with the rank of the server in its server group. With such a scheme of computing the election delay time, the lower the rank of a server is, the longer its election delay time may be because a lower rank server accumulates more communication delays. Since the server that has the shortest election delay time declares to be the master server first, the rank of a server may play a crucial role in the election.

The rank of a server may be determined according to certain criterion. For example, it may be related to the computation power or the bandwidth capacity of the server. In this case, the back-up server that first declares its mastership may correspond to a more powerful back-up server in terms of the criterion. The rank of the servers in a server group may be set up off-line or may be re-ranked when the system configuration changes. Such configuration changes may include the replacement of servers (e.g., a new powerful server to replace an existing server) or upgrades of existing servers (e.g., more processors are added to an existing server so that its computation power is improved).

The criterion used to rank servers may be determined based on application needs. For example, if a server group provides services mainly in scientific computation, the computation powers of the servers may determine their rank. If a different server group provides mainly real-time communication capabilities to users (e.g., video-conferencing over the Internet), the computation power of each server may become less important. In this case, the bandwidth capacity of a server may be employed to improve the quality of service for real-time video-conferencing sessions. It is also possible that the services a server group offers change with time so that the criterion used in ranking the servers may also have to be adjusted accordingly to fit what is required to support the changing services.

Figure 8:
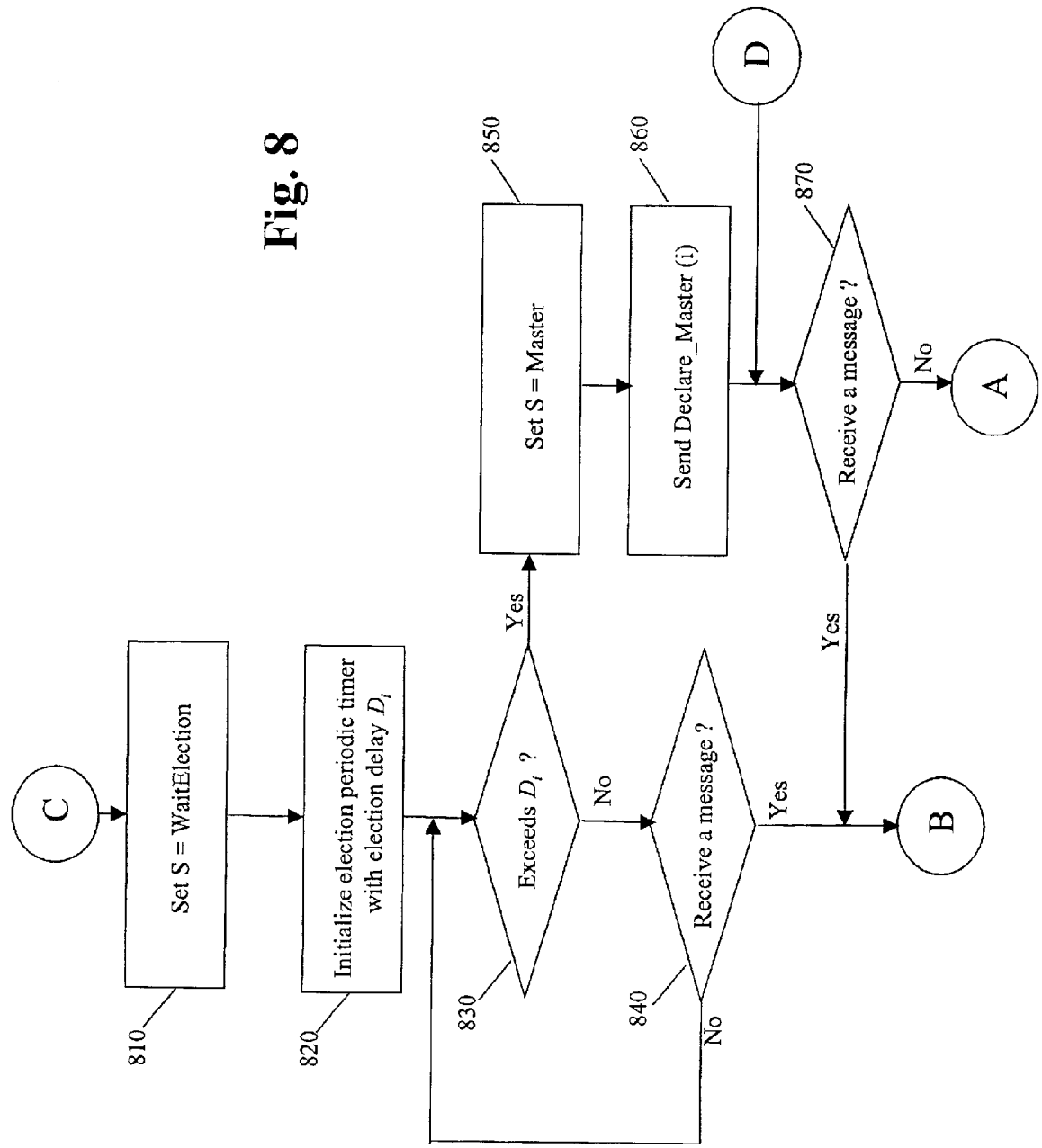
FIG. 8 shows a sample flowchart of a process, in which a server declares itself as a new master.

FIG. 8 is a sample flowchart for the master selection mechanism 620. The election mechanism 310 a running on a back-up server invokes the master selection mechanism 620 when the back-up server 120a detects that the master server 110 failed to respond to its inquiry message. The back-up server 120a enters an election process.

The master selection mechanism 620 first sets, at act 810, the state of the underlying back-up server to a waiting state WaitElection. Assume that the underlying back-up server is the $i^{th}$ server or $S_i$. The election periodic timer for the underlying back-up server $S_i$ is then initialized at act 820. It is set as an integral periodic timer with election delay time $D_i$.

In this embodiment, the back-up server $S_i$ waits, once enters the election process, until the elapse of election delay time $D_i$ and then declares itself as the new master. During the waiting, the master selection mechanism 620 checks, at act 830, whether the election delay time $D_i$ has elapsed. If it has, the master selection mechanism 620 sets, at act 850, the state of the back-up server $S_i$ as master and then sends out a message, at act 860, to all the servers in the server group 320.

The message sent at act 860 informs other servers that server $S_i$ is taking over the mastership. The message may be designated as a special message such as Declare_Master and it may carry parameters that notify the receivers who sends the message or who is taking over the mastership. In this case, the index value i of the server may suffice.

After the Declare_Master(i) is sent out, the new mastership declared by server $S_i$ may be contested or challenged. When this happens, the server that decides to override the new mastership declared by server $S_i$ may send a different message to all the servers in the server group 320, attempting to revoke the mastership declared by server $S_i$. Therefore, after Declare_Master(I) message is sent out, the master selection mechanism 620 checks, at act 870, whether a message is received. If no message is received, the $S_i$'s mastership is considered to be accepted and the process proceeds, via A, to the detection periodic timer 510 (FIG. 5) so that the timer for the regular checks on the new master may be reset. If a message is received at act 870, the process proceeds to the mastership updating mechanism 630 (via B).

While the back-up server $S_i$ is waiting for the elapse of its election delay time $D_i$, a different back-up server that has a shorter election delay time $D_j$, $j \neq i$, may take over the mastership and declare so by sending a message Declare_Master(j) to all the other servers in the server group 320. Therefore, in FIG. 8, prior to the elapse of $D_i$, it is also examined, at act 840, to see whether the back-up server $S_i$ receives a message. If no message is received, the process returns to act 830 to continue the check on the election delay time. If a message is received, the election mechanism 420 proceeds to the mastership updating mechanism 630 (via B).

Figure 9:
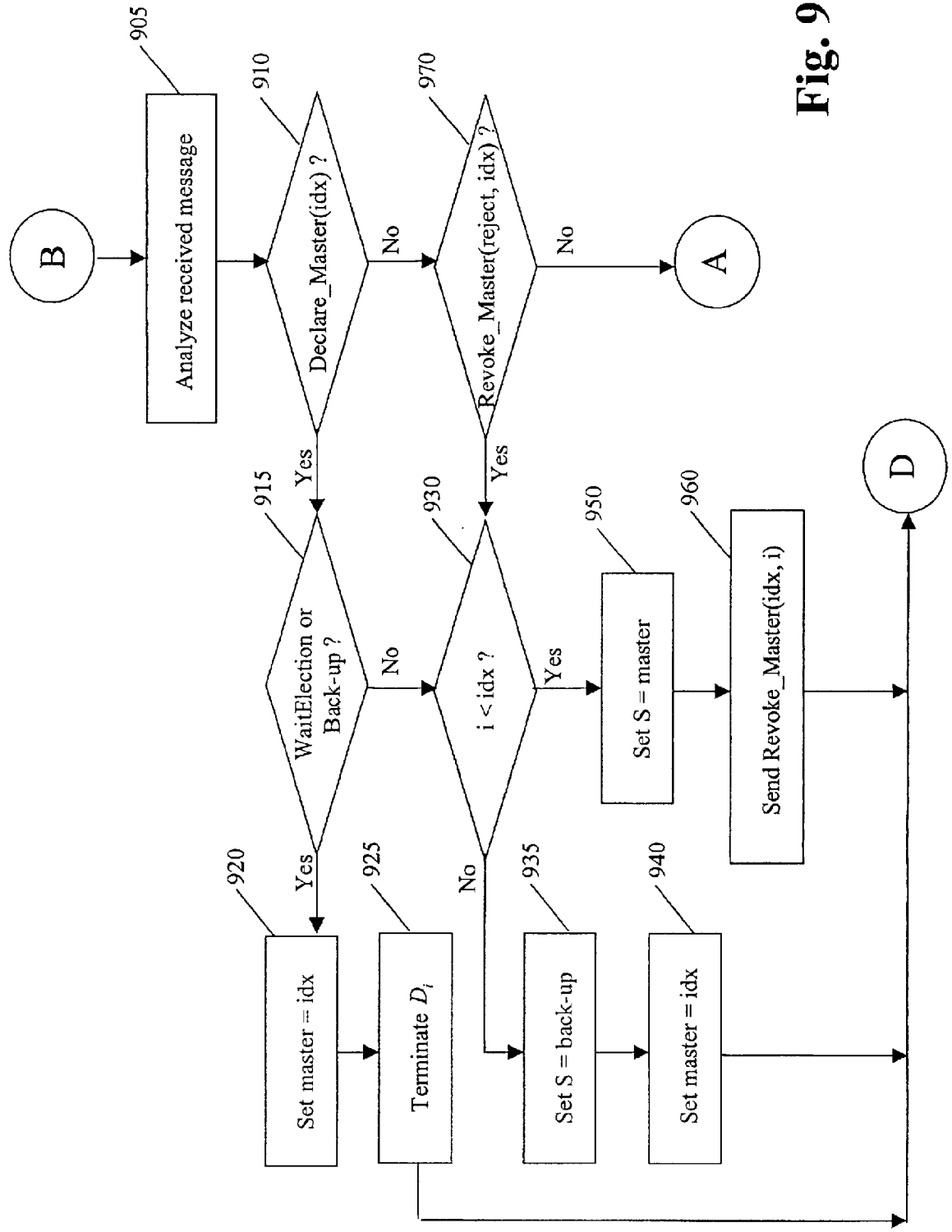
FIG. 9 is a sample flowchart of a process, in which new mastership is being established.

FIG. 9 shows an exemplary flowchart of the mastership updating mechanism 630. At act 905, a message received by server $S_i$ is analyzed. If the received message is an Declare_

Master(idx) message sent from server $S_{idx}$, determined at act 910, the current status of the receiving server ($S_i$) is further determined. If the current status of server $S_i$, checked at act 915, is WaitElection (i.e., server $S_i$ is still waiting for the elapse of its election delay time $D_i$ and server $S_i$ is currently a back-up server), server $S_i$ may simply acknowledge the new mastership declared by server $S_{idx}$. This is achieved by setting the master state (at act 920) of server $S_i$ to be server $S_{idx}$, and then terminating, at act 925, its own election delay time $D_i$. The process then returns to act 870 (FIG. 8) to intercept a message (via D). The return to act 870 (to wait for a message) may be necessary because some server may (different from server $S_i$) contest the mastership declared by server $S_{idx}$ and may soon notify, via a message, all servers, including those that have accepted the mastership declared by server $S_{idx}$, to revoke such mastership.

If the current status of the receiving server ($S_i$) is not WaitElection, then either $S_i$ is the original master server (that is, considered by at least some back-up servers no longer functional) or $S_i$ is a server that is originally a back-up server and just passed its election delay time and just set its state as the new master. That is, at this time instance, server $S_i$ considers itself as the master yet just receives a message that declares some other server to be the new master. In this case, server $S_i$ competes for the mastership with server $S_{idx}$.

In a competing situation, different criteria may be used to determine a winner. For example, based on application needs, a server with a faster computation speed may be chosen as the winner. As another example, if the server group 320 is to provide real-time video conferencing capability to client 150 (an application that requires high bandwidth), it may be more reasonable to choose a competing server that has higher bandwidth capacity to be the new master.

FIG. 9 presents an embodiment in which the server that has a smaller index value becomes the new master. With this embodiment, the index value may be designed to incorporate the selection criteria that are in accordance with particular application needs. For example, the index value of a server may be defined as inversely proportional to the bandwidth capacity of the server. In this way, by choosing a server with a smaller index value, the selected server can better handle the tasks that require higher bandwidth. The use of a smaller server index value is illustrated at acts 930 through 960. It should be appreciated that different embodiments may also used for the selection of a new master.

If server $S_i$ has a smaller index value than server $S_{idx}$ (i<idx), determined at act 930, server $S_i$ becomes the new master. In this case, the state of server $S_i$ is set to be master at act 950 and a revoke message, Revoke_Master(idx,i), is sent, at act 960, to all the other servers in the server group 320 to notify them to replace the mastership declared by server $S_{idx}$ with the mastership of server $S_i$. The process then returns to act 870, via D, to intercept a message.

The return to act 870 (to wait for a message) may be necessary because some server, upon receiving the message Revoke_Master(idx,i), may further contest the mastership declared by server $S_i$ and may soon notify, via a message, all servers to revoke the mastership declared by server $S_i$. A different embodiment is also possible in which returning back to act 870 may be avoided. If server $S_i$ can determine, at act 930, that its index value is the smallest among all servers that are functional (instead of smaller than idx), it is not possible for anyone to contest the mastership declared by server $S_i$. For example, if server $S_i$ has access to a table of IDs for all the functional servers in the same server group, it may be able to determine that it is the best (instead of better) choice to revoke the mastership declared by server $S_{idx}$. In this case, the process may proceed, via A, to reset the detection periodic timer 510 (not shown in FIG. 9).

If server $S_{idx}$ has a smaller index value than server $S_i$ (i≧idx), determined at act 930, the mastership declared by server $S_{idx}$ through message Declare_Master(idx) is accepted by server $S_i$. In this case, the state of server $S_i$ is set, at act 935, to be a back-up server and the master of server $S_i$ is set, at act 940, to be server $S_{idx}$. The process then returns to act 870, via D, to intercept a message. Similarly, the return to further intercept a message may be necessary because some other server may contest and may try to revoke the mastership declared by server $S_{idx}$ by requesting all servers, via a message, to replace the mastership.

If a received message is not Declare_Master, determined at act 910, it is further examined to see, at act 970, whether it is a Revoke_Master message. A Revoke_Master message may carry two parameters representing two server indices, for example, "reject" and "idx". The carried indices may intend to notify receivers to replace the mastership declared by a server represented by index "reject" with the mastership declared by a different server represented by index "idx".

In the illustrated embodiment shown in FIG. 9, when server $S_i$ receives a Revoke_Master message, instead of simply accepting the new mastership declared by server $S_{idx}$, server $S_i$ may determine whether $S_i$ itself is a more appropriate candidate for mastership by comparing its own index value with the index value of server $S_{idx}$.

When the index value of server $S_i$ is smaller than the index value of server $S_{idx}$, determined at act 930, server $S_i$ declares itself as the new master by setting its own state to be the master (at act 950) and by requesting other servers, at act 960, to revoke the mastership of server $S_{idx}$ and accepting server $S_i$ as the master.

When the index value of server $S_i$ is not smaller than the index value of server $S_{idx}$, server $S_i$ accepts server $S_{idx}$ as the master. This is achieved by setting its own state to be a back-up server (at act 935) and then setting its master to be server $S_{idx}$.

As discussed earlier, the illustrative details of one embodiment described above about the election mechanism 310a use integral periodic timers so that each different server enters the election process with a different election delay time. Such an election mechanism corresponds to an linear computational complexity of O(N) in terms of the number of messages sent to complete the election, where N is the number of servers in a server group. When there are a large number of servers in a server group, an election mechanism that uses integral periodic timers for different servers may be able to limit the computational complexity of the election process.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and, materials, such as are within the scope of the appended claims.

What is claimed is:

1. A method for operating a fault-tolerant server group in client-server distributed dynamic network systems, comprising:

receiving, by a master server in a fault-tolerant server group, a request sent by a client, said fault-tolerant server group comprising said master server and at least one back-up server, said master server communicating with both said client and said at least one back-up server, each server in said server group, including said master server and said at least one back-up server, having an election mechanism enabling said fault-tolerant server group to elect a new master server, when said master server fails, in a process in which at least some of the election mechanisms are triggered by timers set to different times relative to the time at which said master server is detected to have failed;

processing, by said fault-tolerant server group, said request to produce a result, said request being processed concurrently by said master server and said at least one back-up server; and sending, by said master server, said result to said client.

2. The method according to claim 1, further comprising determining, by said election mechanism running on said at least one back-up server, whether said master server is functional; and electing a new master server for said fault-tolerant server group when said master server fails, said electing being performed based on at least one election periodic timer associated with said at least one back-up server, said new master server assuming said mastership and communicating with both said client and other servers in said fault-tolerant server group.

3. A method for operating an election mechanism, comprising: detecting, by at least one back-up server, when a master server is not functional, said master server possessing the mastership of a server group, said server group comprising said master server and said at least one back-up server, and electing, when said master server is detected not functional a new master server based on at least one election periodic timer, each of said at least one election periodic timer being associated with a different server in said server group and specifying a length of time relative to the time at which the master server is detected not functional causing said electing to occur at different times for at least some of the servers, said new master server taking over said mastership.

4. The method according to claim 3, wherein said detecting comprises: sending, by each of said at least one back-up server, at least one inquiry message to said master server; examining, by said at least one back-up server, whether a reply, from said master server as a response to said at least one inquiry message, is received within a certain amount of time; determining that said master server is not functional if said reply is not received within said certain amount of time; and determining that said master server is functional if said reply is received from said master server within said certain amount of time.

5. The method according to claim 4, further comprising; initializing a time-out mechanism after said sending, said time-out mechanism including a time-out condition that defines said certain amount of time, said time-out mechanism starting to count time towards said time-out condition after said initializing.

6. The method according to claim 3, wherein said electing comprises: selecting one of said at least one back-up server as the new master server, said selecting being carried out based on said at least one election periodic timer; and updating said mastership based on said new master server.

7. The method according to claim 6, wherein said selecting comprises: setting the state of a back-up server, whose master server is detected not functional, to be a waiting state; initializing an election periodic timer associated with said back-up server, said election periodic timer specifying a particular length of time defined for said back-up server; and declaring, by said back-up server, said back-up server as the new master server, if no message from a different server is received during said particular length of time.

8. The method according to claim 7, wherein said declaring comprises: setting the state of said back-up server to be master; and sending a first message to said at least one back-up server and said master server, said first message declaring said back-up server as the new master server.

9. The method according to claim 7, wherein said particular length of time specified by said election periodic timer is an election delay time associated with said back-up server.

10. The method according to claim 9, wherein said election delay time associated with said back-up server is determined by a summation of a base election delay time and an accumulative maximum communication delays between each of the back-up servers in a first set of back-up servers to a second set of back-up servers.

11. The method according to claim 10, wherein said first set of back-up servers corresponds to the back-up server in said server group that have smaller index than the index of said back-up server.

12. The method according to claim 10, wherein said second set of back-up servers includes the back-up servers in said server group that do not have smaller index than the index of said back-up server.

13. The method according to claim 10, wherein each of said maximum communication delays is computed as the maximum value in communication delay between a back-up server from said first set of back-up servers and all the back-up servers from said second set of back-up servers.

14. The method according to claim 8, wherein said declaring further comprises receiving a first server message from a different server after said sending; and said detecting comprises: receiving a second server message from a different server after said master server is detected functional.

15. The method according to claim 14, wherein said updating comprises: analyzing, by a receiving back-up server that receives either said first server message or said second server message from a different server, said first or second server message to determine whether said message, is a first message or a second message, said first message declares said mastership by said new master server, said second message requesting said receiving back-up server to replace said mastership with the mastership declared by the new master server that sends said second message; establishing, if said message is a first message, said mastership based on a new master server declared in said first message; and determining, if said message is a second message, whether to accept said mastership declared by said new master server in said second message.

16. The method according to claim 15, wherein said establishing comprises: acknowledging, when the state of said receiving back-up server is either a waiting state or a back-up state, said mastership declared by said new master server in said first message; and determining, when the state of said receiving back-up server is neither a waiting state nor a back-up state, whether to accept said mastership declared by said new master server in said first message.

17. The method according to claim 16, wherein said acknowledging comprises: setting the master state of said receiving back-up server to be said new master server; and terminating said election periodic timer associated with said receiving back-up server.

18. The method according to claim 16, wherein said determining comprises: comparing said receiving back-up server with said new master server according to at least one criterion to yield a result of either positive, indicating that said receiving back-up server wins, or negative, indicating that said receiving back-up server loses; accepting said mastership, declared by said new master server, if said result is negative; and revoking said mastership, declared by said new master server, if said result is positive.

19. The method according to claim 18, wherein said at least one criterion includes that the index of said new master server is greater than the index of said receiving back-up server.

20. The method according to claim 19, wherein said index of a server is determined according to the computational power of said server.

21. The method according to claim 19, wherein said index of a server is determined according to the bandwidth capacity of said server.

22. The method according to claim 18, wherein said accepting comprises: setting the state of said receiving back-up server to be back-up; and setting the master state of said receiving back-up server to be said new master server.

23. The method according to claim 18, wherein said revoking comprises: setting the state of said receiving back-up server to be back-up; and sending, by said receiving back-up server, a second message to all other servers in said server group, said second message carrying both the index of said new master server and the index of said receiving back-up server and requesting said all other servers to revoke the mastership previously declared by said new master server, represented by the index of said new master server, and to accept the mastership currently declared by said receiving back-up server, represented by said index of said receiving back-up server.

24. The method according to claim 3, further comprising triggering said detecting based on a detection periodic timer.

25. The method according to claim 24 wherein said detection periodic timer includes an equally periodic timer.

26. A fault-tolerant server group in distributed dynamic network systems, comprising: a client; and a fault-tolerant server group for providing a service to said client, said fault-tolerant server group comprising a master server and at least one back-up server, said master server communicating with said client, wherein each server in said fault-tolerant server group, including said master server and said back-up server, is associated with an election mechanism enabling said fault-tolerant server group to elect, when said master server fails, a new master server, in a process in which at least some of the election mechanisms are triggered by timers set to different times relative to the time at which said master server is detected to have failed.

27. The server group according to claim 26, further comprising a name server for registering the mastership of said master server.

28. A system for an election mechanism, comprising: a detection mechanism for detecting, by at least one back-up server, when a master server is not functional, said waster server possessing the mastership of a fault-tolerant server group, said server group comprising said master server and said at least one back-up server; and an election mechanism for electing, when said master server is detected not functional, a new master server based on at least one election periodic timer, each of said at least one election periodic timer being associated with a different server in said server group and specifying a length of time relative to the time at which the master server is detected not functional, causing at least some of the servers to elect at different times, said new master server taking over said mastership.

29. The system according to claim 28, wherein said election mechanism comprises: an election periodic timer associated with a back-up server for controlling the election delay time of said back-up server; a master selection mechanism for selecting said new master server based on said election periodic timer; and a mastership updating mechanism for updating said mastership based on said new master server.

30. A computer readable medium having program code stored thereon, such that when the code is read and executed by a computer, the computer is caused to: receive, by a master server in a fault-tolerant server group, a request sent by a client, said fault-tolerant server group comprising said master server and at least one back-up server, said master server communicating with both said client and said at least one back-up server, each saver in said server group, including said master server and said at least one back-up server, having an election mechanism, enabling said fault-tolerant server group to elect, when said master server fails, a new master server, in a process in which at least some of the election mechanisms are triggered mechanisms are triggered by timers set to different times relative to the time at which said master server is detected to have failed; process, by said fault-tolerant server group, said request to produce a result, said request being processed concurrently by said master server and said at least one back-up server; and send, by said master server, said result to said client.

31. The medium according to claim 30, wherein the code recorded on the medium further causes said computer to: determine, by said election mechanism running on said at least one back-up server, whether said master is functional; and elect a new master server for said fault-tolerant server group, when said master server fails, said electing being performed based on at least one election periodic timer associated with said at least one back-up server, said new master server assuming said mastership and communicating with both said client and other servers in said fault-tolerant server group.

32. A computer readable medium having program code stored thereon, such that when the code is read and executed by a computer, the computer is caused to: detect, by at least one back-up server, when a master server is not functional, said master server possessing the mastership of a server group, said server group comprising said master server and said at least one back-up server; and elect, when said master server is detected not functional, a new master server based on at least one election periodic timer, each of said at least one election periodic timer being associated with a different server in said server group and specifying a length of time relative to the time at which the master server is detected not functional, causing at least some of the servers to elect at different times, said new master server taking over said mastership.

33. The medium according to claim 32, wherein the code recorded on the medium further causes said computer to: send, by each of said at least one back-up server, at least one inquiry message to said master server; examine, by said at least one back-up server, whether a reply, from said master server as a response to said at least one inquiry message, is received within a certain amount of time; determine that said master server is not functional if said reply is not received within said certain amount of time; and determine that said master server is functional if said reply is received from said master server within said certain amount of time.

34. The medium according to claim 33, wherein the code recorded on the medium further causes said computer to: initialize a time-out mechanism after said send that includes a time-out condition that defines said certain amount of time, said time-out mechanism starting to count time towards said time-out condition after said initialize.

35. The medium according to claim 32, wherein the code recorded on the medium further causes said computer to: select one of said at least one back-up server as the new master server, said selecting being carried out based on said at least one election periodic timer; and update said mastership based on said new master server, selected by said selecting.

36. The medium according to claim 35, wherein the code recorded on the medium further causes said computer to: set the state of a back-up server, whose master server is detected not functional, to be a waiting state; intialize an election periodic timer associated with said back-up server, said election periodic timer specifying a particular length of time defined for said back-up server; and declare, by said back-up server, said back-up server as the new master server, if no message from a different server is received during said particular length of time.

37. The medium according to claim 36, wherein the code recorded on the medium further causes said computer to: set the state of said back-up server to be master; and send a first message to said at least one back-up server and said master server, said first message declaring said back-up server as the new master server.

38. The medium according to claim 36, wherein said declare further comprising: receiving a first server message from a different server after said send; and said detect comprises: receiving a second server message from a different server after said master server is detected functional.

39. The medium according to claim 38, wherein the code recorded on the medium further causes said computer to: analyze, by a receiving back-up server that receives either said first server message or said second server message from a different server, said first or second server message to determine whether said message is a first message or a second message, said first message declares said mastership by said new master server, said second message requesting said receiving back-up server to replace said mastership with the mastership declared by the new master server that sends said second message; establish, if said message is a first message, said mastership based on a new master server declared in said first message, said new master server being represented in said first message by an index designated to said new master server; and determine, if said message is a second message, whether to accept said mastership declared by said new master server in said second message.

40. The medium according to claim 39, wherein the code recorded on the medium further causes said computer to: acknowledge, when the state of said receiving back-up server is either a waiting state or a back-up state, said mastership declared by said new master server in said first message; and determine, when the state of said receiving back-up server is neither the waiting state nor the back-up state, whether to accept said mastership declared by said new master server in said first message.

41. The medium according to claim 40, wherein the code recorded on the medium further causes said computer to: set the master slate of said receiving back-up server to be said new master server; and terminate said election periodic timer associated with said receiving back-up server.

42. The medium according to claim 40, wherein the code recorded on the medium further causes said computer to: compare said receiving back-up server with said new master server according to at least one criterion to yield a result of either positive, indicating that said receiving back-up server wins, or negative, indicating that said receiving back-up server loses; accept said mastership, declared by said new master server, if said result is negative; and revoke said mastership, declared by said new master server, if said result is positive.

43. The medium according to claim 42, wherein said at least one criterion includes that the index designated to said new master server is greater than the index designated to said receiving back-up server.

44. The medium according to claim 42, wherein said accept comprises: setting the state of said receiving back-up server to be back-up; and setting the master state of said receiving back-up server to be said new master server.

45. The medium according to claim 42, wherein said revoke comprises: setting the state of said receiving back-up server to be master; and sending, by said receiving back-up server, a second message to all other servers in said server group, said second message carrying both the index of said new master server and the index of said receiving back-up server and requesting said all other servers to revoke the mastership previously declared by said new master server, represented by the index of said new master server, and to accept the mastership currently declared by said receiving back-up server, represented by said index of said receiving back-up server.

46. The medium according to claim 32, wherein the code recorded on the medium further causes said computer to trigger said detecting based on a detection periodic timer.

47. The medium according to claim 46, wherein said detection periodic timer includes an equally periodic timer.

* * * * *